United States Patent [19]

Kodera et al.

[11] Patent Number: 5,657,103
[45] Date of Patent: Aug. 12, 1997

[54] LIQUID CRYSTAL DEVICE

[75] Inventors: Yasuto Kodera, Fujisawa; Yoshio Hotta, Atsugi; Yukio Hanyu, Atsugi; Katsutoshi Nakamura, Atsugi, all of Japan

[73] Assignee: Canon Kabushiki Kaisha, Tokyo, Japan

[21] Appl. No.: 478,601

[22] Filed: Jun. 7, 1995

Related U.S. Application Data

[63] Continuation of Ser. No. 276,498, Jul. 18, 1994, abandoned, which is a continuation of Ser. No. 854,587, Mar. 20, 1992, abandoned.

[30] Foreign Application Priority Data

Mar. 22, 1991 [JP] Japan .................. 3-081105

[51] Int. Cl.$^6$ .................. G02F 1/1337
[52] U.S. Cl. .................. 349/133; 349/154
[58] Field of Search .................. 359/75, 76, 78, 359/80, 81, 100, 62; 349/133, 124, 134, 155, 154

[56] References Cited

U.S. PATENT DOCUMENTS

| | | |
|---|---|---|
| 4,367,924 | 1/1983 | Clark et al. . |
| 4,639,089 | 1/1987 | Okada et al. . |
| 4,681,404 | 7/1987 | Okada et al. . |
| 4,682,858 | 7/1987 | Kanbe et al. . |
| 4,709,994 | 12/1987 | Kanbe et al. . |
| 4,712,872 | 12/1987 | Kanbe et al. . |
| 4,712,873 | 12/1987 | Kanbe et al. . |
| 4,712,874 | 12/1987 | Kanbe et al. . |
| 4,712,875 | 12/1987 | Kanbe et al. . |
| 4,721,367 | 1/1988 | Yoshinaga et al. . |
| 4,728,176 | 3/1988 | Tsuboyama et al. . |
| 4,740,060 | 4/1988 | Komura et al. . |
| 4,744,639 | 5/1988 | Tsuboyama . |
| 4,747,671 | 5/1988 | Takahashi et al. . |
| 4,763,992 | 8/1988 | Takada et al. . |
| 4,773,738 | 9/1988 | Hayakawa et al. . |
| 4,776,676 | 10/1988 | Inoue et al. . |
| 4,778,259 | 10/1988 | Kitayama et al. . |
| 4,783,148 | 11/1988 | Tsuboyama et al. . |
| 4,796,979 | 1/1989 | Tsuboyama . |
| 4,800,382 | 1/1989 | Okada et al. . |
| 4,802,740 | 2/1989 | Hotta et al. . |
| 4,816,178 | 3/1989 | Katagiri et al. . |
| 4,818,075 | 4/1989 | Takao et al. . |
| 4,818,078 | 4/1989 | Takao et al. . |
| 4,820,026 | 4/1989 | Okada et al. . |
| 4,836,656 | 6/1989 | Mouri et al. . |
| 4,844,590 | 7/1989 | Okada et al. . |
| 4,869,577 | 9/1989 | Masaki . |
| 4,878,740 | 11/1989 | Inaba et al. . |

(List continued on next page.)

FOREIGN PATENT DOCUMENTS

| | | |
|---|---|---|
| 0307959 | 3/1989 | European Pat. Off. . |
| 0424944 | 5/1991 | European Pat. Off. . |
| 018522 | 1/1987 | Japan . |
| 247326 | 10/1987 | Japan . |
| 295021 | 12/1987 | Japan . |
| 081324 | 4/1988 | Japan . |
| 0220224 | 9/1988 | Japan . |
| 0226115 | 9/1990 | Japan . |
| 025117 | 5/1991 | Japan . |
| 2230105 | 10/1990 | United Kingdom . |

Primary Examiner—William L. Sikes
Assistant Examiner—James A. Dudek
Attorney, Agent, or Firm—Fitzpatrick, Cella, Harper & Scinto

[57] ABSTRACT

There is disclosed a ferroelectric liquid crystal device in which a pair of substrates and having electrodes are arranged so that the electrode surfaces face each other, a sealing agent is provided in the peripheral edge portions of the substrates, a liquid crystal injection port is opened in a part of the sealing agent, and a liquid crystal is injected from the injection port into a gap between both of the substrates. An intersection angle which is formed by the rubbing direction to orient the liquid crystal and the direction to inject the liquid crystal from the injection port lies within a range from −45° to +45°.

13 Claims, 5 Drawing Sheets

U.S. PATENT DOCUMENTS

| | | |
|---|---|---|
| 4,879,059 | 11/1989 | Hanyu et al. . |
| 4,898,456 | 2/1990 | Okada et al. . |
| 4,907,859 | 3/1990 | Takada et al. . |
| 4,917,471 | 4/1990 | Takao et al. . |
| 4,917,473 | 4/1990 | Watanabe ............................ 359/80 |
| 4,932,757 | 6/1990 | Hanyu et al. . |
| 4,932,758 | 6/1990 | Hanyu et al. . |
| 5,000,545 | 3/1991 | Yoshioka et al. . |
| 5,007,716 | 4/1991 | Hanyu et al. . |
| 5,013,137 | 5/1991 | Tsuboyama et al. . |
| 5,020,883 | 6/1991 | Eca et al. ............................ 359/80 |
| 5,026,144 | 6/1991 | Taniguchi et al. . |
| 5,054,890 | 10/1991 | Hanyu et al. . |
| 5,078,475 | 1/1992 | Sekimura et al. . |
| 5,099,344 | 3/1992 | Tsuboyama et al. ............... 359/100 |
| 5,109,293 | 4/1992 | Matsunaga et al. ................. 359/62 |
| 5,132,816 | 7/1992 | Itoh et al. ........................... 359/75 |
| 5,223,963 | 6/1993 | Okada et al. ....................... 359/100 |
| 5,225,105 | 7/1993 | Koseki et al. ..................... 252/297.66 |
| 5,268,780 | 12/1993 | Hanyu et al. ...................... 359/75 |
| 5,323,253 | 6/1994 | Iwayama et al. ................... 359/76 |

FIG. 3
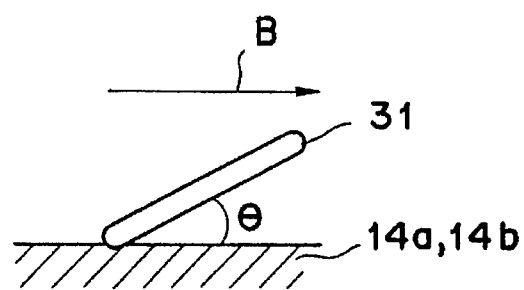
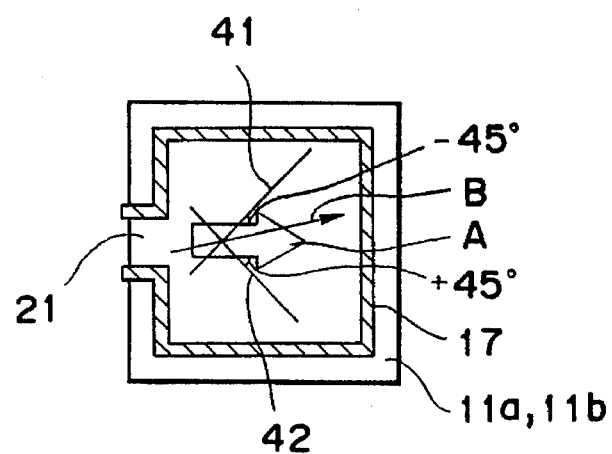
FIG. 4A
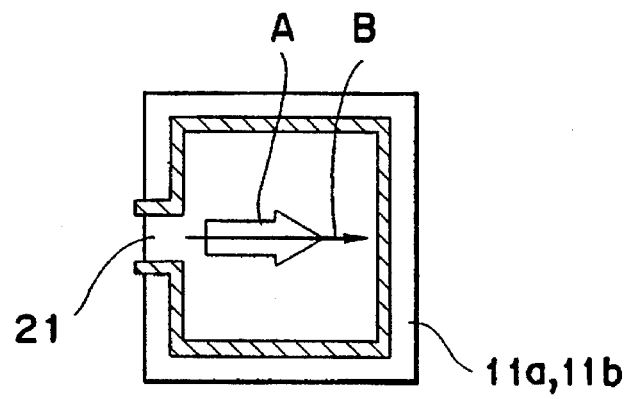
FIG. 4B

FIG. 5A
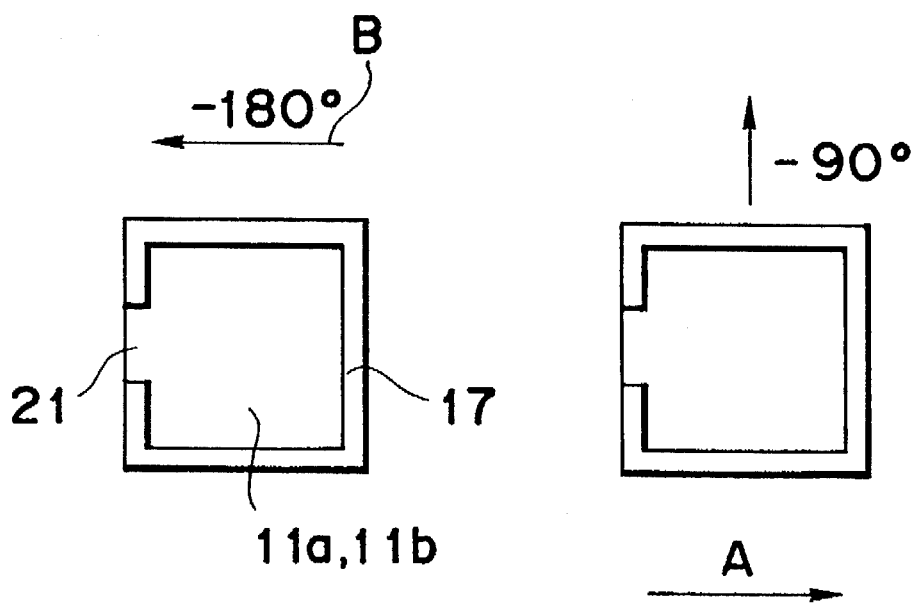
FIG. 5B
FIG. 5C
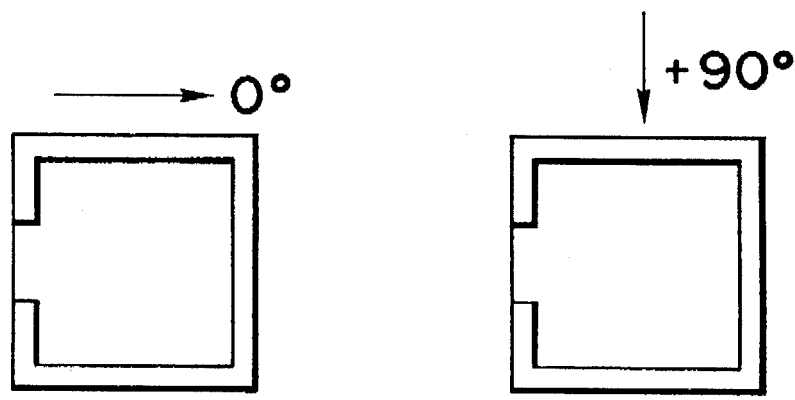
FIG. 5D 701 702 703 704

LIQUID CRYSTAL DEVICE

This application is a continuation of application Ser. No. 08/276,498 filed Jul. 18, 1994, now abandoned, which is a continuation of application Ser. No. 07/854,587, filed Mar. 20, 1992, now abandoned.

BACKGROUND OF THE INVENTION

1. Field of the Invention

The invention relates to a liquid crystal device using a chiral smectic liquid crystal having ferroelectricity.

2. Related Background Art

A liquid crystal device having bistability has been proposed by Clark and Lagerwall (specification of U.S. Pat. No. 4,367,924 and the like). As a liquid crystal having bistability, a ferroelectric liquid crystal having a chiral smectic C phase (SmC*) or H phase (SmH*) is generally used. The above liquid crystal has a bistable state comprising first and second optical stable states for an electric field. Therefore, different from an optical modulating device used in a conventional TN type liquid crystal, for instance, the liquid crystal is oriented in the first optical stable state for one of the electric field vectors and the liquid crystal is oriented in the second optical stable state for the other electric field vector. The above type of liquid crystal has a feature such that it extremely quickly has either one of the two stable states in response to the electric field which is applied and maintains such a state when no electric field is applied. By using such a feature, a problem such that the conventional TN type device has wrong characteristics about the angle of field is fairly essentially improved.

Particularly, as chiral smectic liquid crystal devices, there have conventionally been known devices as disclosed in, for instance, U.S. Pat. Nos. 4,639,089, 4,681,404, 4,682,858, 4,709,994, 4,712,872, 4,712,873, 4,712,874, 4,712,875, 4,721,367, 4,728,176, 4,740,060, 4,744,639, 4,747,671, 4,763,992, 4,773,738, 4,776,676, 4,778,259, 4,783,148, 4,796,979, 4,800,382, 4,802,740, 4,818,075, 4,818,078, 4,820,026, 4,836,656, 4,844,590, 4,869,577, 4,878,740, 4,879,059, 4,898,456, 4,907,859, 4,917,471, 4,932,757, 4,932,758, 5,000,545, 5,007,716, 5,013,137, 5,026,144, 5,054,890, and 5,078,475, and the like.

When a chiral smectic liquid crystal is injected to a liquid crystal panel of a large area (for instance, a diagonal size is equal to or larger than 14 inches) and a cell is formed, zigzag defects as disclosed in, for instance, U.S. Pat. No. 4,932,758 occur. It has been found out that such an occurrence tendency of the zigzag defects delicately relates to an anchoring effect to the substrate surface on which the liquid crystal molecules are oriented.

SUMMARY OF THE INVENTION

It is an object of the invention to provide a liquid crystal device which reduces the occurring tendency of the zigzag defects mentioned above.

According to the first aspect of the invention, there is disclosed a liquid crystal device comprising: a pair of substrates; a sealing member provided between the pair of substrates so as to form a sealing gap excluding an injection port; a chiral smectic liquid crystal which is arranged in the sealing gap and is obtained from a smectic A phase, a cholesteric phase, or an isotropic phase by reducing the temperature; and a sealing member to seal the injection port, wherein orientation processing axes (for instance, rubbing processing axes) which are parallel to each other and are set in the same direction are given to a pair of surfaces of the pair of substrate which are come into contact with the liquid crystal, and the injection port is arranged in a manner such that when a liquid crystal material is being injected from the injection port into the sealing gap under a temperature state such as to cause the smectic A phase, cholesteric phase, or isotropic phase, the orientation processing axes exist in a range between the +45° axis which is inclined clockwise by 45° from the injecting direction of the liquid crystal material and the −45° axis which is inclined counterclockwise by 45° from the injecting direction and intersect at an acute angle for the injecting direction of the liquid crystal material.

According to the second aspect of the invention, there is disclosed a liquid crystal device comprising: a pair of substrates; a sealing member provided between the pair of substrates so as to form a sealing gap excluding an injection port; a chiral smectic liquid crystal which is arranged in the sealing gap and is obtained from a smectic A phase, a cholesteric phase, or an isotropic phase by reducing the temperature; and a sealing member to seal the injection port, wherein orientation processing axes (for instance, rubbing processing axes) which are parallel to each other and are set in the same direction are given to a pair of surfaces of the pair of substrates which are come into contact with the liquid crystal, and the injection port is arranged in a manner such that when a liquid crystal material is being injected from the injection port into the sealing gap under a temperature state such as to cause the smectic A phase, cholesteric phase, or isotropic phase, the orientation processing axes are set into almost the same direction as the injecting direction of the liquid crystal material.

According to the third aspect of the invention, there is disclosed a liquid crystal device comprising: a pair of substrates; a sealing member provided between the pair of substrates so as to form a sealing gap excluding an injection port; a chiral smectic liquid crystal which is arranged in the sealing gap and is obtained from a smectic A phase, a cholesteric phase, or an isotropic phase by reducing the temperature; and a sealing member to seal the injection port, wherein orientation processing axes (for instance, rubbing processing axes) in such directions as to intersect each other at a first acute angle (for instance, 3° to 30°, preferably, 3° to 10°) are given to a pair of surfaces of the pair of substrates which are come into contact with the liquid crystal, and the injection port is arranged in a manner such that when a liquid crystal material is being injected from the injection port into the sealing gap under a temperature state such as to cause the smectic A phase, cholesteric phase, or isotropic phase, an axis corresponding to the angle of ½ of the acute angle exists in a range between the +45° axis which is inclined clockwise by 45° from the injecting direction of the liquid crystal material and the −45° axis which is inclined counterclockwise by 45° from the injecting direction and is set in such a direction as to intersect at a second acute angle for the injecting direction of the liquid crystal material.

According to the fourth aspect of the invention, there is disclosed a liquid crystal device comprising: a pair of substrates; a sealing member provided between the pair of substrates so as to form a sealing gap excluding an injection port; a chiral smectic liquid crystal which is arranged in the sealing gap and is obtained from a smectic A phase, a cholesteric phase, or an isotropic phase by reducing the temperature; and a sealing member to seal the injection port, wherein orientation processing axes (for instance, rubbing processing axes) in such direction as to intersect each other at an acute angle (for instance, 3° to 30°, preferably, 3° to 10°) are given to a pair of surfaces of the pair of substrates which are come into contact with the liquid crystal, and the injection port is arranged in a manner such that when a liquid crystal material is being injected from the injection port into the sealing gap under a temperature state such as to cause the smectic A phase, cholesteric phase, or isotropic phase, an axis corresponding to the angle of ½ of the acute angle is set into almost the same direction as the injecting direction of the liquid crystal material.

BRIEF DESCRIPTION OF THE DRAWINGS

FIG. 3 is an explanatory diagram of the rubbing direction;

FIGS. 4A and 4B are explanatory diagrams showing the relations between the injecting direction and the rubbing direction, respectively;

FIGS. 5A to 5D are explanatory diagrams of intersection angles for the rubbing direction and the injecting direction of embodiments, respectively;

DETAILED DESCRIPTION OF THE PREFERRED EMBODIMENTS

Figure 1:
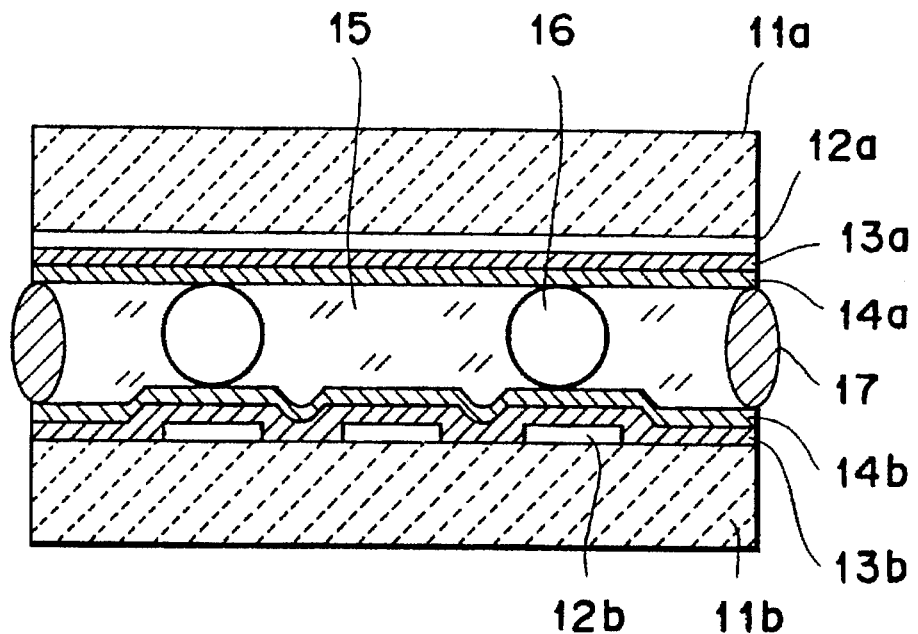
FIG. 1 is a cross sectional view of a ferroelectric liquid crystal device of the invention.

FIG. 1 is schematic diagram showing an example of a ferroelectric liquid crystal cell of the invention.

Reference numerals 11a and 11b denote glass substrates. Transparent electrodes 12a and 12b made of $In_2O_3$, ITO (Indium Tin Oxide), etc. are formed on the glass substrates. Insulative films ($SiO_2$, film, $TiO_2$ film, $Ta_2O_5$ film, etc.) 13a and 13b having thicknesses within a range from 200 to 3000 Å and rubbing processed orientation control films 14a and 14b such as polyimide films or the like having thicknesses within a range from 50 to 1000 Å are laminated on the transparent electrodes, respectively. A ferroelectric chiral smectic liquid crystal 15 is filled between the substrates 11a and 11b. A distance between the substrates 11a and 11b is set to a value within a range from 0.1 to 3μm and is held by a beads spacer 16 (silica beads, alumina beads, etc.) arranged between both of the substrates. A spiral structure of the chiral smectic liquid crystal is suppressed.

Figures 2A, 2B:
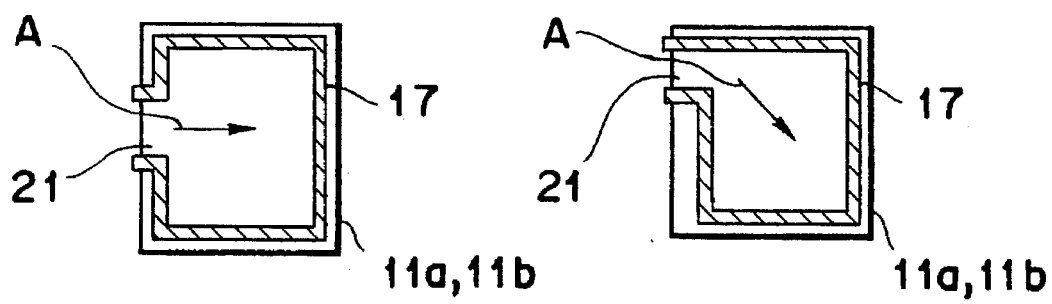
FIGS. 2A and 2B are plan views of devices showing different examples of sealing shapes.

The substrates 11a and 11b are adhered by a sealing adhesive agent 17. As shown in FIGS. 2A and 2B, the adhesive agent 17 is provided around the substrates and a part of the adhesive agent 17 is opened as an injection port 21 to inject liquid crystal. The inside of a panel is set into a vacuum, the liquid crystal is coated to the injection port, the injection port is sealed by the liquid crystal, a temperature of the liquid crystal panel is raised after that, and the liquid crystal is progressed into the panel, thereby injecting the liquid crystal.

The orientation of the liquid crystal is largely influenced by the injecting state. The injection is influenced by the relation between an injecting direction A shown in FIG. 2 and a rubbing direction (not shown). The rubbing process is executed to the orientation control films 14a and 14b. As shown in FIG. 3, a rubbing direction B denotes a direction in which a liquid crystal molecule is floating from the orientation surface by a pretilt angle θ (5° or more). In FIG. 4A, there are shown the rubbing direction B, the injecting direction (processing direction) A, a −45° axis 41 corresponding to an axis which is inclined counterclockwise by 45° from the injecting direction A of the liquid crystal and a 45° axis 42 corresponding to an axis which is inclined clockwise by 45° from the injecting direction.

According to FIG. 4A, the injecting direction A and the rubbing direction B intersect at an acute angle (intersection angle at this time lies within a range from 10° to 80°, preferably, 20° to 70°).

In FIG. 4B, the injecting direction A and the rubbing direction B are parallel to each other and are set in the same direction.

The rubbing processing directions A used in cells of FIGS. 4A and 4B are given to both of the substrates 11a and 11b and are parallel to each other and are set to the same direction. According to another practical example, the rubbing directions given to the substrates 11a and 11b can be intersected at an acute angle, for instance, 3° to 30°, preferably, 3° to 10°. In this instance, it is desirable to decide the injecting direction for a central axis of the intersection angle as mentioned above.

Practical examples of the invention will now be described in detail.

<EMBODIMENTS 1 TO 3, COMPARISON EXAMPLES 1 TO 7>

Two glass plates each having a thickness of 1.1 mm are prepared. Stripe-shaped electrodes made of ITO are formed on the glass substrates, respectively. Further, $SiO_2$ films each having a thickness of 1000 Å are formed as insulative films for prevention of short-circuits of the upper and lower electrodes by a sputtering method. A polyimide forming liquid LQ1802 (made by Hitachi Chemical co., Ltd.) is coated onto the $SiO_2$ films by a spinner and is subjected to a heat burning process, thereby forming polyimide orientation films. The rubbing process is executed to the polyimide coating films after completion of the burning of the two substrates. The rubbing direction will be explained hereinlater. After completion of the rubbing process, alumina beads whose average grain diameter is equal to about 1.5μm are dispersed onto one of the substrates. After that, an adhesive agent of an epoxy resin is formed onto the other substrate by a shape as shown in FIG. 2 by a screen printer. Two glass substrates are adhered and a panel is formed. A diagnosis size of the panel is equal to 14 inches.

Figure 6:
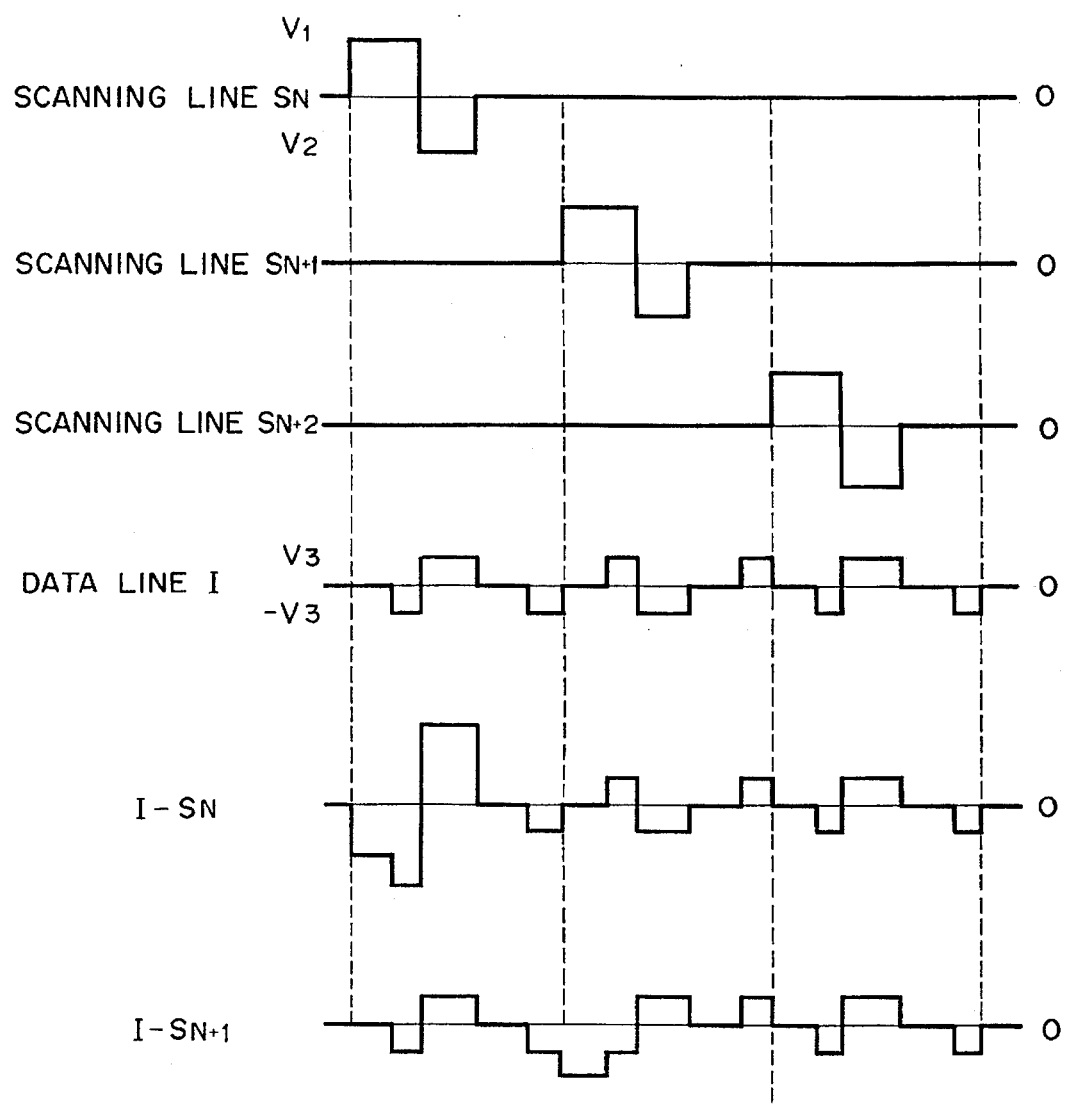
FIG. 6 is a waveform diagram of driving voltages used in the embodiment.

Ten kinds of panels for matrix driving in which intersection angles of the rubbing direction B and the injecting direction A lie within a range from −180° to +120° are formed. FIGS. 5A to 5D show the relations between the rubbing direction B and the injecting direction A. The mixed ferroelectric liquid crystal containing phenylpyrimidine as a main component is injected into each of the above panels from the injection port. Voltages of driving waveforms shown in FIG. 6 are applied to those matrix panels and the orientation uniformity of the whole panel is observed under cross nicols with respect to each of the panels. The results are shown below.

TABLE 1

| Panel | Angle between injecting direction and rubbing direction | Orientation uniformity of whole panel | Evaluation |
| --- | --- | --- | --- |
| Comparison example 1 | A | −180° | Domains of different contrasts occur near injection port | X |
| Comparison example 2 | B | −120° | Domains of different contrasts occur | X |
| Comparison example 3 | C | −90° | A number of domains of different contrasts occur | X |
| Comparison example 4 | D | −60° | Rough orientation occurs in edge portion of panel | X |
| Embodiment 1 | E | −45° | Rough orientation occurs in edge delicate portion of panel | ○ |
| Embodiment 2 | F | 0° | Whole surface is uniform | ⊙ |
| Embodiment 3 | G | +45° | Rough orientation occurs in edge delicate portion of panel | ○ |
| Comparison example 5 | H | +60° | Rough orientation occurs in edge portion of panel | Δ |
| Comparison example 6 | I | +90° | A number of domains of different contrast occur | X |
| Comparison example 7 | J | +120° | Domains of different contrasts occur | X |

As shown in the above results, in the panels E, F, and G, by setting the angle formed by the injecting direction and the rubbing direction into a value within a range from −45° to 45°, the orientation which is uniform as a whole can be obtained.

Figure 7:
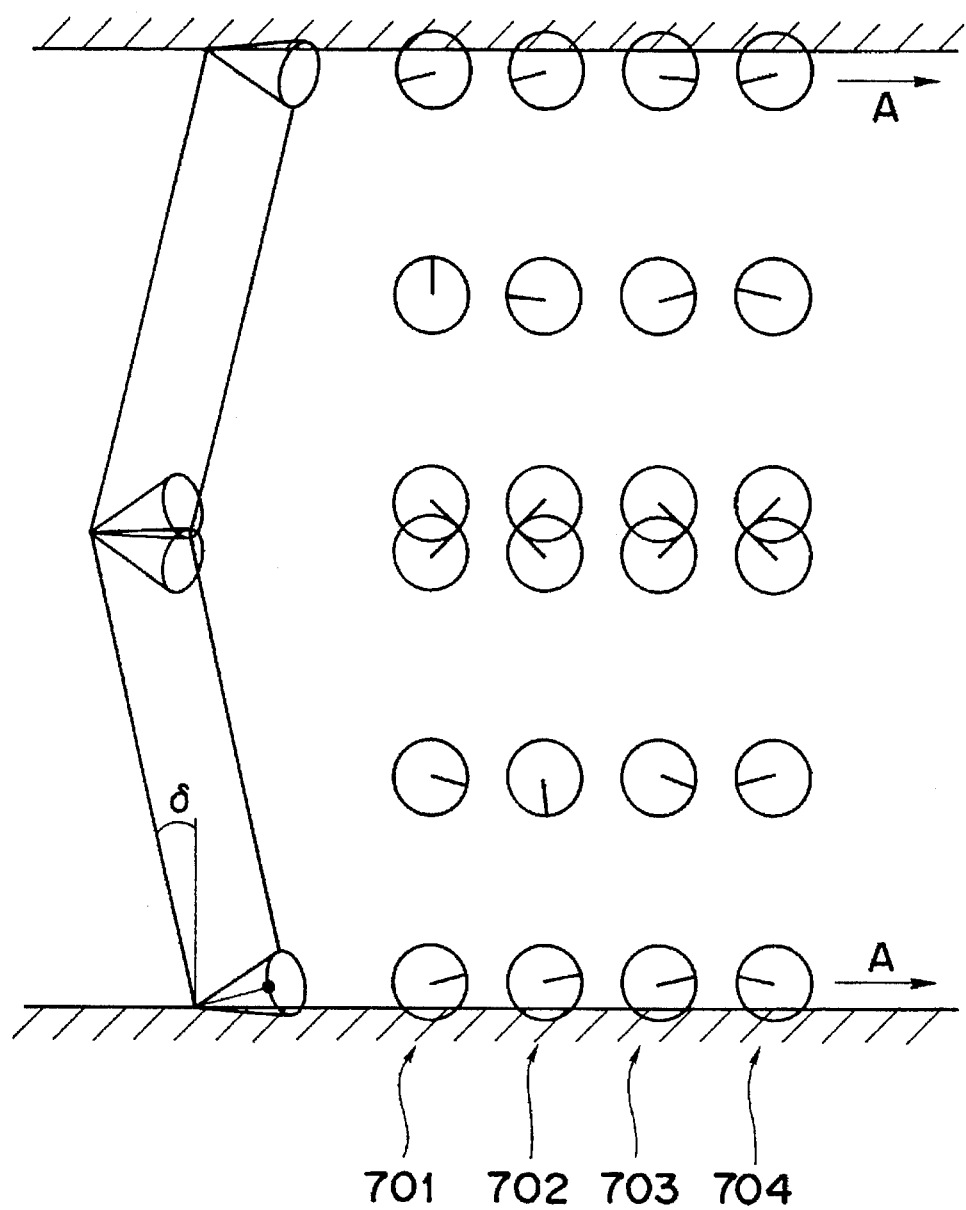
FIG. 7 is a schematic arrangement diagram of liquid crystal molecules used in the invention.

Further, to examine the orienting states of the cells formed, the layer structures of the Sm*C phase are examined by an X-ray diffracting method by using an X-ray analyzing apparatus RAD-11B (45 kV, 30 mA). Thus, the cell has a chevron structure as shown in FIG. 7. An inclination angle δ of the layer is equal to 10.5°. In FIG. 7, reference numerals 701 to 704 denote schematic diagrams showing arrangements of directions at respective positions between the substrates and show states in the cases where the directors are projected to the bottom surface of a cone and are seen from the direction of the bottom surface. Reference numerals 701 and 702 denote arrangements of the directors showing white and black two states of the spray orientation and 703 and 704 denote arrangements of the directors showing white and black two states of the uniform orientation. The orientations of the panels formed in the embodiments correspond to the uniform orientations shown by reference numerals 703 and 704. The domains of different contrasts occurring in the comparison examples correspond to a state in which the uniform orientation and the spray orientations shown by reference numerals 701 and 702 mixedly exist. As shown in the results of the observation about the orientation uniformity, in the panels E, F, and G, by setting the angle formed by the injecting direction and the rubbing direction to a value within a range from −45° to +45°, the orientation which is uniform as a whole can be obtained.

As described above, by setting the rubbing direction and the injecting direction (progressing direction) of the liquid crystal to the same direction (0°) or by intersecting them within a range from −45° to +45°, the ferroelectric liquid crystal device of the orienting state which is uniform on the whole panel is derived.

What is claimed is:

1. A liquid crystal device, comprising:

a pair of substrates;

a sealing member provided between said pair of substrates forming a sealing gap and a display area circumscribed by the sealing member, said sealing gap including an injection port;

a chiral smectic liquid crystal within said sealing gap and which is obtained by reducing a temperature from smectic A, cholesteric, or isotropic phase, said chiral smectic liquid crystal having within substantially the entire display area a layer structure comprising a layer having chevron structure which comprises plural liquid crystal molecules, in which the layer forming the chevron structure is inclined in one direction with regard to said substrate adjacent thereto and the liquid crystal molecule adjacent to said substrate is also inclined in said one direction, wherein the liquid crystal molecules at least in the vicinity of said substrate are arranged in an orientation capable of switching between two states; and a sealing member to seal said injection port;

wherein said pair of substrates which contact said liquid crystal comprise polyimide aligning surfaces having parallel axes of treatment which are in the same direction as each other so as to orient said liquid crystal molecules; and wherein said injection port is arranged such that when a liquid crystal material is injected from the injection port into the seal gap under a smectic A, cholesteric, or isotropic phase temperature state, said axes of treatment range between an axis which is inclined clockwise by 45° from said injecting direction of said liquid crystal material and an axis which is inclined counterclockwise by 45° from said injecting direction and intersect the injecting direction of the liquid crystal material at an acute angle.

2. A liquid crystal device according to claim 1, wherein said axes of treatment are axes of rubbing processing treatment.

3. A liquid crystal device according to claim 1, wherein an interval between said pair of substrates is sufficiently thin to suppress a spiral structure of said chiral smectic liquid crystal.

4. A liquid crystal device, comprising:

a pair of substrates;

a sealing member provided between said pair of substrates forming a sealing gap and a display area circumscribed by the sealing member, said sealing gap including an injection port;

a chiral smectic liquid crystal which is arranged within said sealing gap and is obtained by reducing a temperature from a smectic A, cholesteric, or isotropic phase, said chiral smectic liquid crystal having within the entire display area a layer structure comprising a layer having chevron structure which comprises plural liquid crystal molecules, in which the layer forming the chevron structure is inclined in one direction with regard to said substrate adjacent thereto and the liquid crystal molecule adjacent to said substrate is also inclined in said one direction, wherein the liquid crystal molecules at least in the vicinity of said substrate are arranged in an orientation capable of switching between two states; and a sealing member to seal said injection port;

wherein said pair of substrates which contact said liquid crystal comprise polyimide aligning surfaces having axes of treatment so as to orient said liquid crystal molecules in directions which intersect each other at an acute angle $\Phi_1$; and wherein said injection port is arranged such that when a liquid crystal material is injected from the injection port into the sealing gap under a smectic A, cholesteric, or isotropic phase temperature state, an axis corresponding to the angle $\Phi_1/2$ exists in a range between an axis which is inclined counterclockwise by 45° from an injecting direction of said liquid crystal material and an axis which is inclined counterclockwise by 45° from said injecting direction and is set to a direction as to intersect the injecting direction of the liquid crystal material at an acute angle ($\Psi$).

5. A liquid crystal device according to claim 4, wherein said axes of treatment are axes of rubbing processing treatment.

6. A liquid crystal device according to claim 4, wherein said angle ($\Phi_1$) lies within a range from 3° to 30°.

7. A liquid crystal device according to claim 4, wherein said angle ($\Phi_1$) lies within a range from 3° to 10°.

8. A liquid crystal device according to claim 7, wherein said angle ($\Phi_1$) lies within a range of 3° to 30°.

9. A liquid crystal device according to claim 7, wherein said angle ($\Phi_1$) lies within a range from 3° to 10°.

10. A liquid crystal device according to claim 7, wherein said axes of treatment are axes of rubbing processing treatment.

11. A liquid crystal device according to claim 7, wherein an interval between said pair of substrates is sufficiently thin to suppress a spiral structure of said chiral smectic liquid crystal.

12. A liquid crystal device according to claim 4, wherein an interval between said pair of substrates is sufficiently thin to suppress a spiral structure of said chiral smectic liquid crystal.

13. A liquid crystal device, comprising:

a pair of substrates;

a sealing member provided between said pair of substrates forming a sealing gap and a display area circumscribed by the sealing member, said sealing gap including an injection port;

a chiral smectic liquid crystal within said sealing gap and which is obtained by reducing a temperature from a smectic A, cholesteric, or isotropic phase, said chiral smectic liquid crystal having a layer structure comprising a layer having within substantially the entire display area chevron structure which comprises plural liquid crystal molecules, in which the layer forming the chevron structure is inclined in one direction with regard to said substrate adjacent thereto and the liquid crystal molecule adjacent to said substrate is also in inclined in said one direction, wherein the liquid crystal molecules at least in the vicinity of said substrate are arranged in an orientation capable of switching between two states; and a sealing member to seal said injection port;

wherein said pair of substrates which contact said liquid crystal comprise polyimide aligning surfaces having axes of treatment so as to orient said liquid crystal molecules in directions which intersect each other at an acute angle ($\Phi_1$); and wherein said injection port is arranged such that when a liquid crystal material is injected from the injection port into the sealing gap under a smectic A, cholesteric, or isotropic phase temperature state, an axis at an angle $\Phi_1/2$ to both axes of the treatment is set to almost the same direction as an injecting direction of the liquid crystal material.

* * * * *

UNITED STATES PATENT AND TRADEMARK OFFICE
CERTIFICATE OF CORRECTION

PATENT NO. : 5,657,103

DATED : August 12, 1997

INVENTOR(S) : YASUTO KODERA, ET AL.

It is certified that error appears in the above-identified patent and that said Letters Patent is hereby corrected as shown below:

COLUMN 2

Line 2, "substrate" should read --substrates--.

COLUMN 3

Line 11, "cross sectional" should read --cross-sectional--; and
Line 55, "is progressed" should read --progresses--.

COLUMN 5

Line 47, "spray" should read --splay--; and
Line 54, "spray" should read --splay--.

COLUMN 6

Line 31, "the seal" should read --said sealing--.

COLUMN 7

Line 24, "claim 7," should read --claim 13,--;
Line 26, "claim 7," should read --claim 13,--;
Line 28, "claim 7," should read --claim 13,--; and
Line 31, "claim 7," should read --claim 13,--.

UNITED STATES PATENT AND TRADEMARK OFFICE
CERTIFICATE OF CORRECTION

PATENT NO. : 5,657,103

DATED : August 12, 1997

INVENTOR(S) : YASUTO KODERA, ET AL.

It is certified that error appears in the above-identified patent and that said Letters Patent is hereby corrected as shown below:

COLUMN 8

Line 17, "in" should be deleted.

Signed and Sealed this

Thirty-first Day of March, 1998

Attest:

BRUCE LEHMAN

Attesting Officer

Commissioner of Patents and Trademarks